United States Patent
Wang et al.

(10) Patent No.: US 9,504,032 B2
(45) Date of Patent: Nov. 22, 2016

(54) METHOD, WIRELESS TRANSMIT/RECEIVE UNIT (WTRU) AND BASE STATION FOR TRANSFERRING SMALL PACKETS

(71) Applicant: INTERDIGITAL PATENT HOLDINGS, INC., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 74 days.

(21) Appl. No.: 14/025,023

(22) Filed: Sep. 12, 2013

(65) Prior Publication Data

US 2014/0071873 A1 Mar. 13, 2014

Related U.S. Application Data

(60) Provisional application No. 61/700,720, filed on Sep. 13, 2012, provisional application No. 61/831,759, filed on Jun. 6, 2013.

(51) Int. Cl.
*G08C 17/00* (2006.01)
*H04W 72/04* (2009.01)
*H04W 72/12* (2009.01)
(Continued)

(52) U.S. Cl.
CPC ..... *H04W 72/0446* (2013.01); *H04W 72/1284* (2013.01); *H04W 74/08* (2013.01); *H04L 1/0083* (2013.01); *H04L 1/1607* (2013.01); *H04W 84/12* (2013.01)

(58) Field of Classification Search
None
See application file for complete search history.

(56) References Cited

U.S. PATENT DOCUMENTS 8,462,684 B1 * 6/2013 Kopikare ............ H04W 52/267
370/311
2005/0030953 A1 2/2005 Vasudevan et al.
(Continued)

FOREIGN PATENT DOCUMENTS

JP 2006-060788 A 3/2006
JP 2007-509530 A 4/2007
(Continued)

OTHER PUBLICATIONS

Cheong, "TGah Functional Requirements and Evaluation Methodology Rev. 5," IEEE P802.11 Wireless LANs, IEEE 802.11-11/0905r5 (Jan. 2012), pp. 1-20.
(Continued)

*Primary Examiner* — Robert Wilson
(74) *Attorney, Agent, or Firm* — Condo Roccia Koptiw LLP

(57) ABSTRACT

A method, a wireless transmit/receive unit (WTRU) and a base station for transferring small packets are described. The WTRU generates a packet that has one or more of a medium access control (MAC) or a physical layer convergence protocol (PLCP) header, the one or more of the MAC or the PLCP header including a field. On a condition that the WTRU has data buffered for transmission, the WTRU includes in the field information that indicates a time or a transmission opportunity (TXOP) needed to transmit at least one packet of data that the WTRU has buffered for transmission. The WTRU transmits the packet to another WTRU in the wireless network. The WTRU receives another packet from the other WTRU with a granted TXO) based on the time needed to transmit the at least one packet of the data that the WTRU has buffered for transmission.

20 Claims, 10 Drawing Sheets

(51) Int. Cl.
*H04W 74/08* (2009.01)
*H04W 84/12* (2009.01)
*H04L 1/00* (2006.01)
*H04L 1/16* (2006.01)

(56) References Cited

U.S. PATENT DOCUMENTS

| | | | |
|---|---|---|---|
| 2005/0135318 | A1 | 6/2005 | Walton et al. |
| 2006/0039345 | A1 | 2/2006 | Perez-Costa et al. |
| 2006/0268886 | A1* | 11/2006 | Sammour ............ H04W 28/18 370/394 |
| 2008/0259853 | A1 | 10/2008 | Ito et al. |
| 2009/0017767 | A1 | 1/2009 | Mashimo et al. |
| 2009/0225711 | A1* | 9/2009 | Sammour ............ H04L 47/10 370/329 |
| 2010/0034214 | A1* | 2/2010 | Zhang ................ H04L 12/4035 370/445 |
| 2013/0301579 | A1* | 11/2013 | Zhang ................ H04W 72/10 370/329 |
| 2014/0071873 | A1* | 3/2014 | Wang ................ H04W 74/08 370/311 |
| 2015/0055546 | A1* | 2/2015 | Jafarian ............ H04B 7/15528 370/315 |
| 2015/0063190 | A1* | 3/2015 | Merlin ................ H04L 5/0037 370/312 |

FOREIGN PATENT DOCUMENTS

| | | |
|---|---|---|
| JP | 2009-021713 A | 1/2009 |
| JP | 2010-114809 A | 5/2010 |
| KR | 10-2009-0034527 A | 4/2009 |
| KR | 10-2009-0132640 A | 12/2009 |
| WO | WO 2005-039127 A1 | 4/2005 |
| WO | WO 2006-106634 A1 | 10/2006 |
| WO | WO 2011-090567 A2 | 7/2011 |
| WO | 2011/112741 | 9/2011 |
| WO | 2012/077901 | 6/2012 |
| WO | WO 2012/096549 A2 | 7/2012 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.4 (Nov. 2011), pp. 1-347.

Gong et al., "11ah Channelization of China," IEEE 802.11-11/1320r0 (Sep. 2011), pp. 1-5.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009), pp. 1-534.

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012), pp. 1-2793.

Wong et al., "Speed Frame Exchange," IEEE 802.11-12/0834r0 (Jul. 2012), pp. 1-17.

* cited by examiner

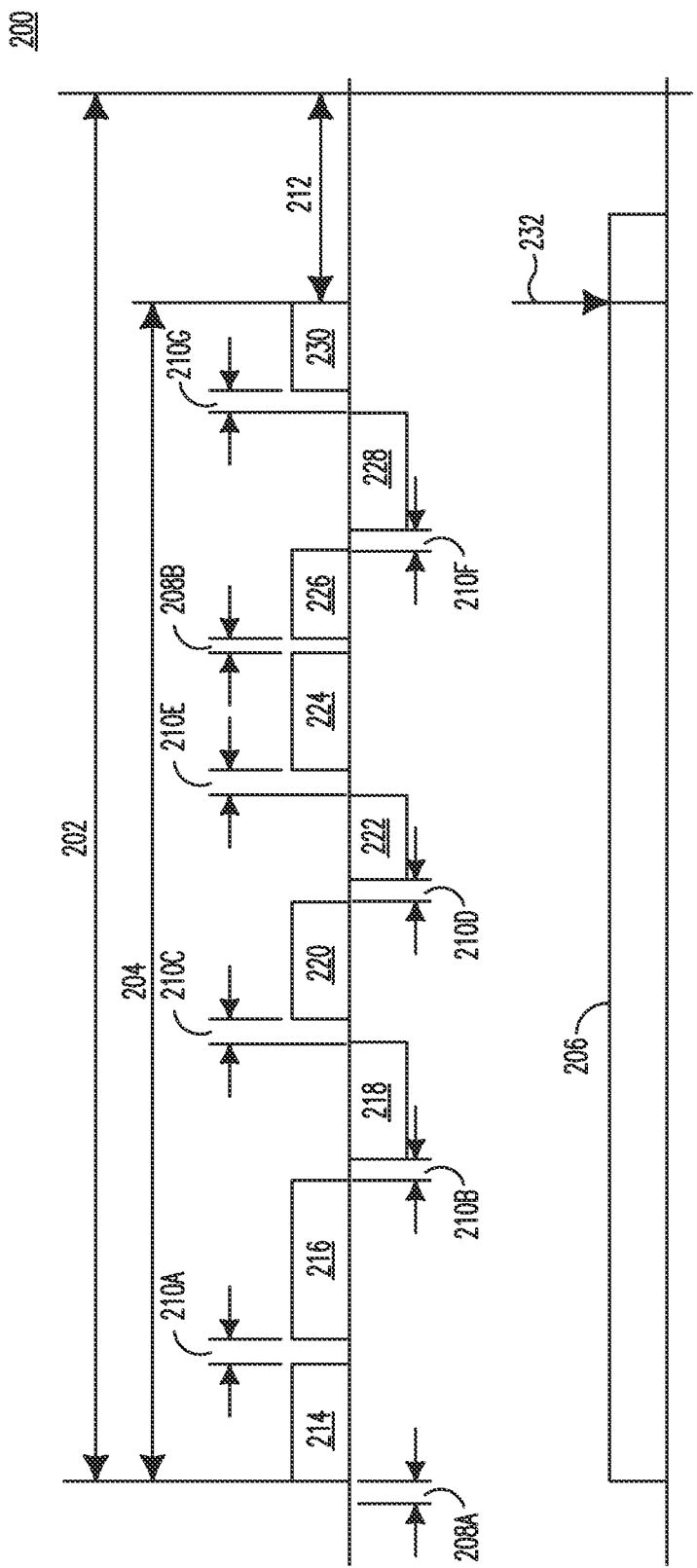

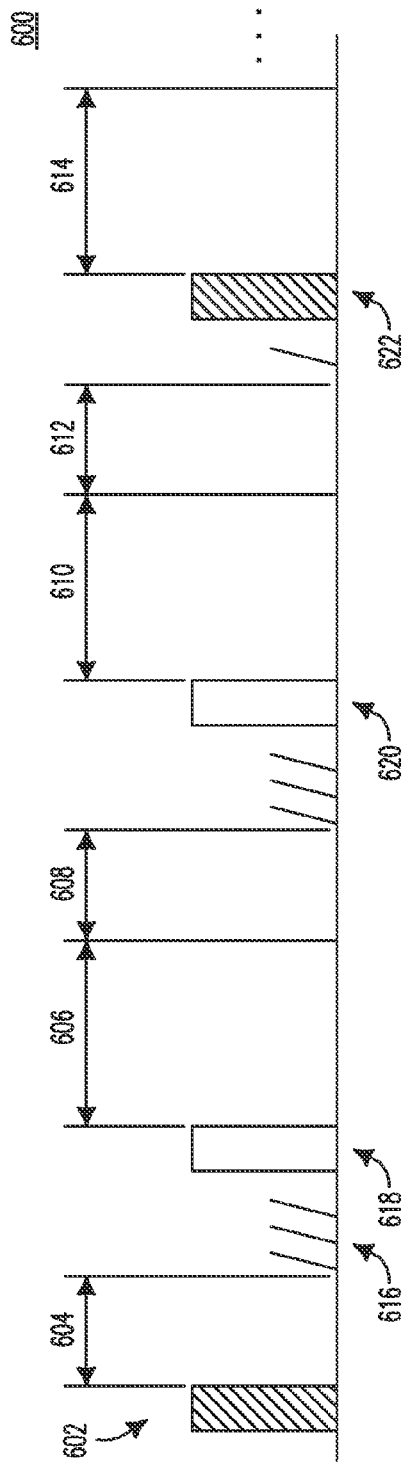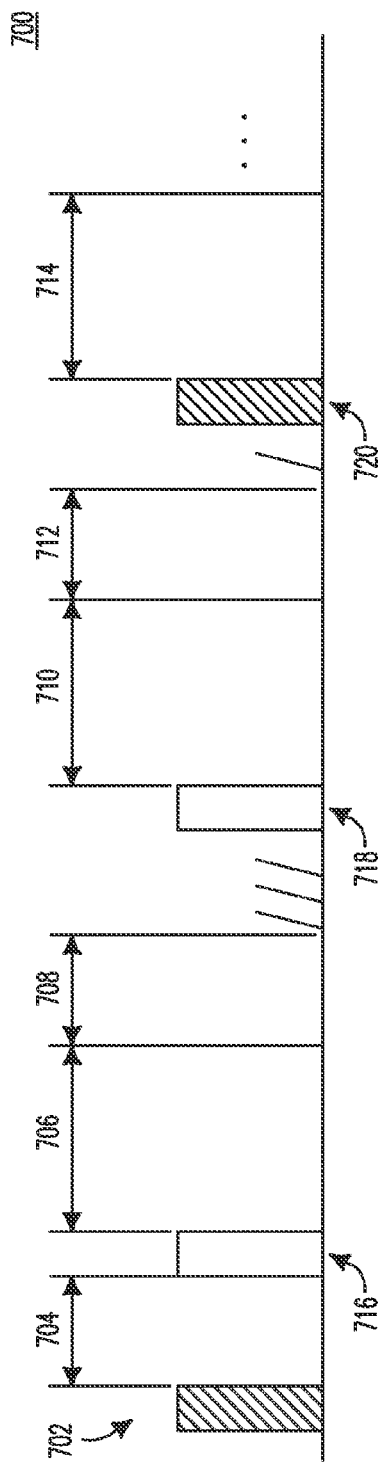

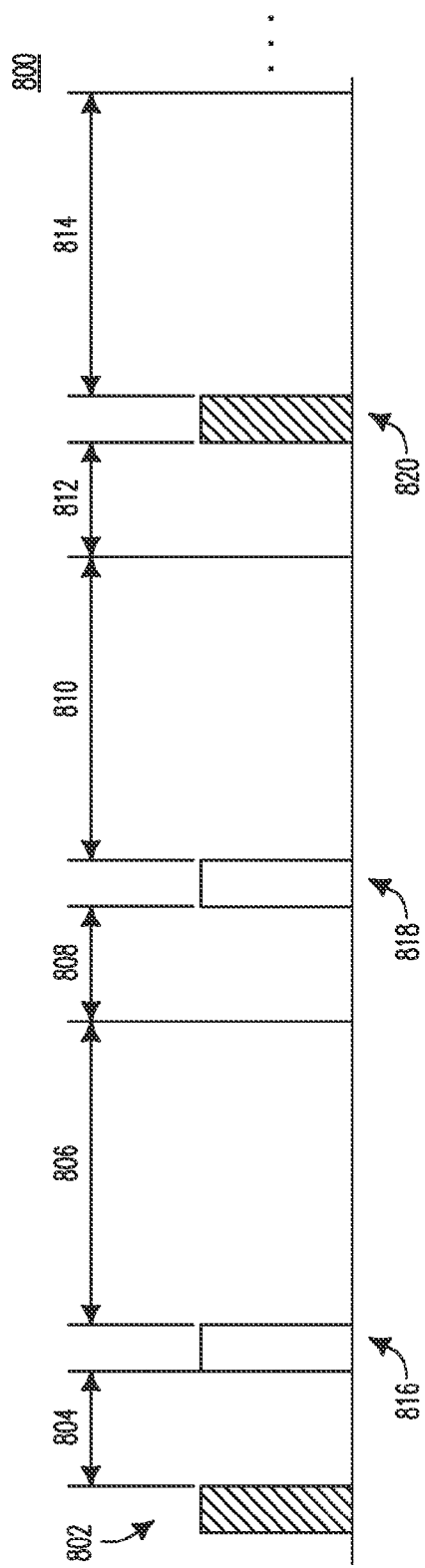
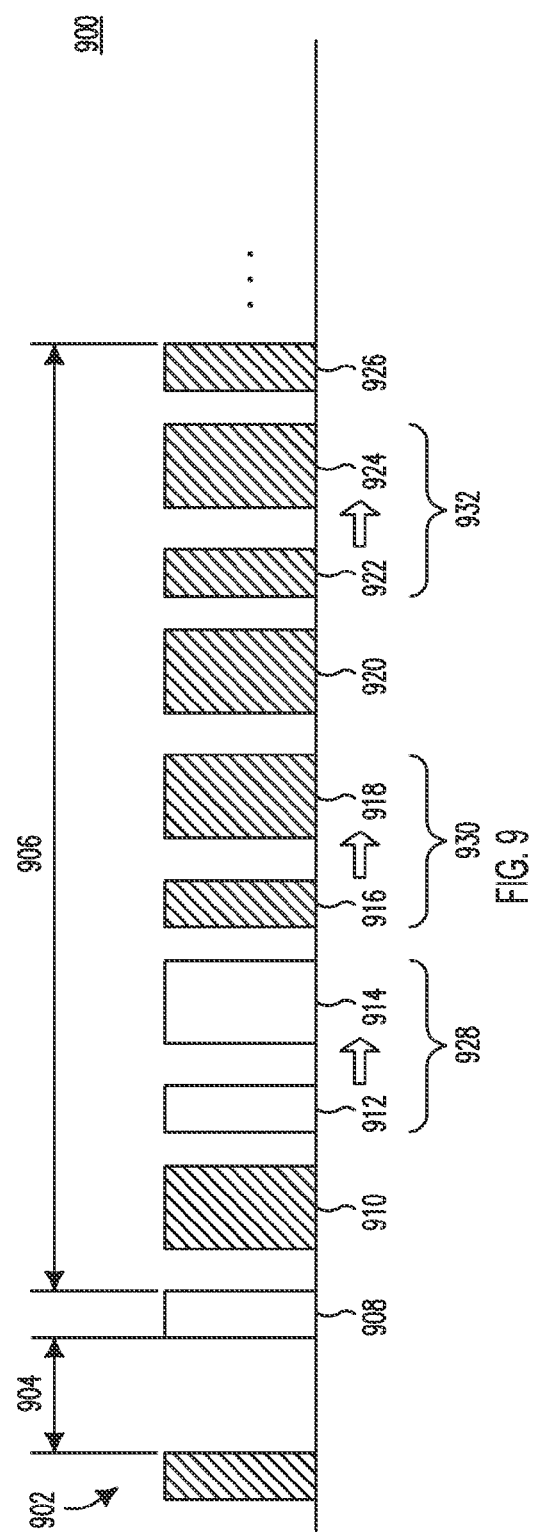

METHOD, WIRELESS TRANSMIT/RECEIVE UNIT (WTRU) AND BASE STATION FOR TRANSFERRING SMALL PACKETS

CROSS REFERENCE TO RELATED APPLICATIONS

This application claims the benefit of U.S. Provisional Application No. 61/700,720 filed Sep. 13, 2012 and U.S. Provisional Application No. 61/831,759 filed Jun. 6, 2013, the contents of which are hereby incorporated by reference herein.

BACKGROUND

A wireless local area network (WLAN) is a LAN that connects wireless devices or stations (STAs). In an infrastructure basic service set (BSS) mode, a WLAN includes an access point (AP) for the BSS and one or more STAs associated with the AP. The AP may have access, or an interface, to a distribution system (DS) or other type of wired or wireless network that carries traffic in and out of the BSS. Traffic originating from outside the BSS, but ultimately destined to a STA inside the BSS, may arrive through the AP, which may deliver it to the appropriate STA. Similarly, traffic originating from STAs and destined to devices outside of the BSS may be sent to the AP for delivery to the appropriate device outside of the BSS. Traffic being exchanged between STAs in the BSS (also referred to as peer-to-peer traffic) may be sent via the AP or may be transferred directly between source and destination STAs with a direct link setup (DLS) using an Institute of Electrical and Electronics Engineers (IEEE) 802.11e DLS or an IEEE 802.11z tunneled DLS (TDLS). In an Independent BSS mode, a WLAN has no AP, and, therefore, STAs in an Independent BSS mode communicate directly with each other.

Due at least to the nature and operation of at least some WLANS, WLAN STAs may need to transmit uplink (UL) small frames frequently. Such UL small frames may include, for example, power-save polls (PS-Polls), voice over internet protocol (VoIP) packets that may have medium access control (MAC) service data unit (MSDU) frames of around 120 bytes, industrial process automation in which frames may have an MSDU size of around 64 bytes, and packets that include data on web browsing clicking that may have MSDU frames of around 64 bytes.

SUMMARY

A method, a wireless transmit/receive unit (WTRU) and a base station for transferring small packets are described. The WTRU generates a packet that has one or more of a medium access control (MAC) or a physical layer convergence protocol (PLCP) header, the one or more of the MAC or the PLCP header including a field. On a condition that the WTRU has data buffered for transmission, the WTRU includes in the field information that indicates a time needed to transmit at least one packet of data that the WTRU has buffered for transmission. The WTRU transmits the packet to another WTRU in the wireless network. The WTRU receives another packet from the other WTRU with a granted transmission opportunity (TXOP) based on the time needed to transmit the at least one packet of the data that the WTRU has buffered for transmission.

BRIEF DESCRIPTION OF THE DRAWINGS

A more detailed understanding may be had from the following description, given by way of example in conjunction with the accompanying drawings wherein:

FIG. 2 is a diagram of an example point coordination function (PCF) frame transfer;

FIG. 6 is a diagram of an example of group-based channel contention;

FIG. 7 is a diagram of another example of group-based channel contention;

FIG. 8 is a diagram of another example of group-based channel contention;

FIG. 9 is a diagram of an example Intra-CG transmission grant and surrogate polling procedure.

DETAILED DESCRIPTION

Figure 1A:
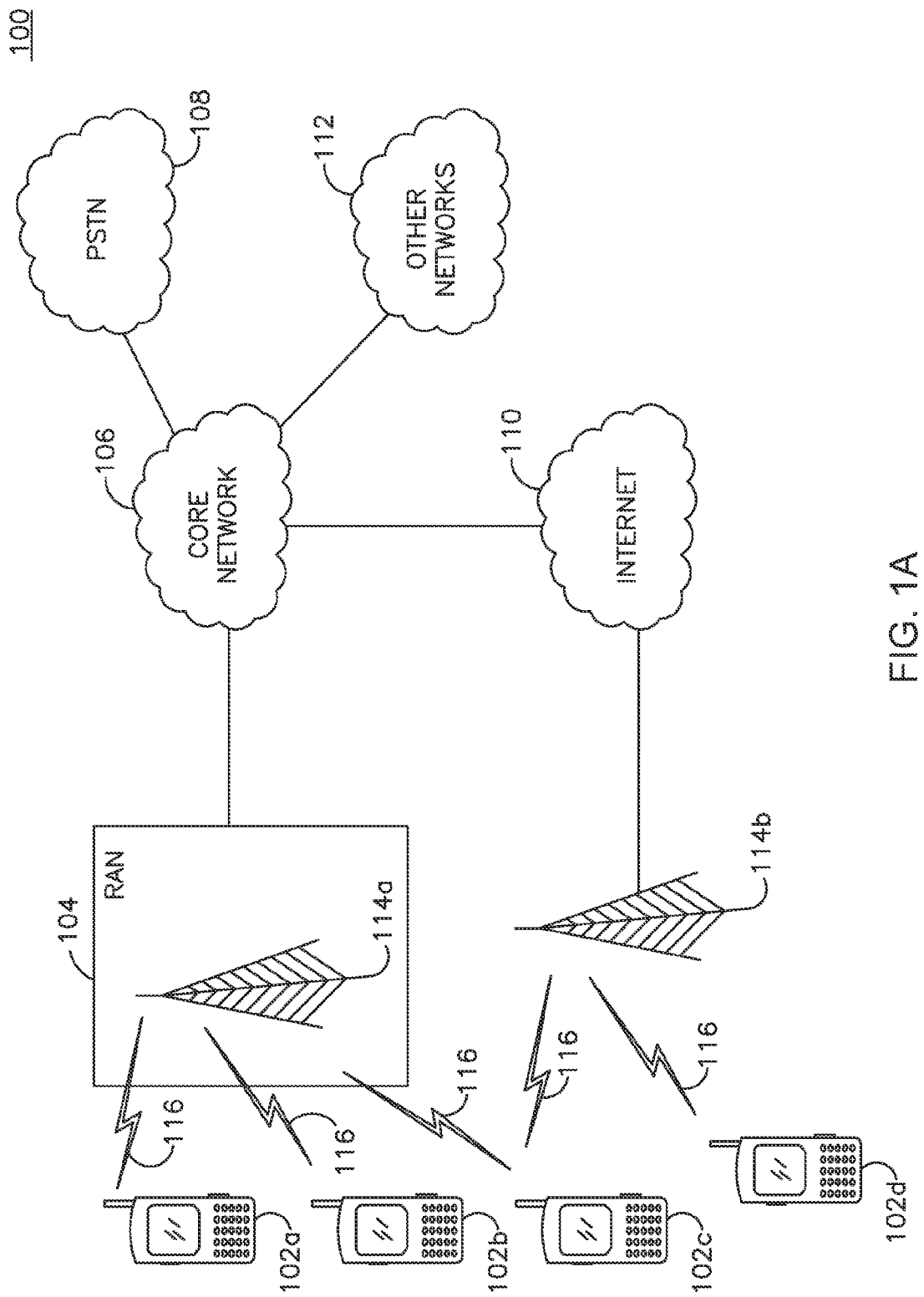
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a station (STA), an access point (AP) and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114a in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114a and the WTRUs 102c, 102d may implement a radio technology such as IEEE 802.11 to establish a wireless local area network (WLAN). In another embodiment, the base station 114a and the WTRUs 102c, 102d may implement a radio technology such as IEEE 802.15 to establish a wireless personal area network (WPAN). In yet another embodiment, the base station 114a and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114a may have a direct connection to the Internet 110. Thus, the base station 114a may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
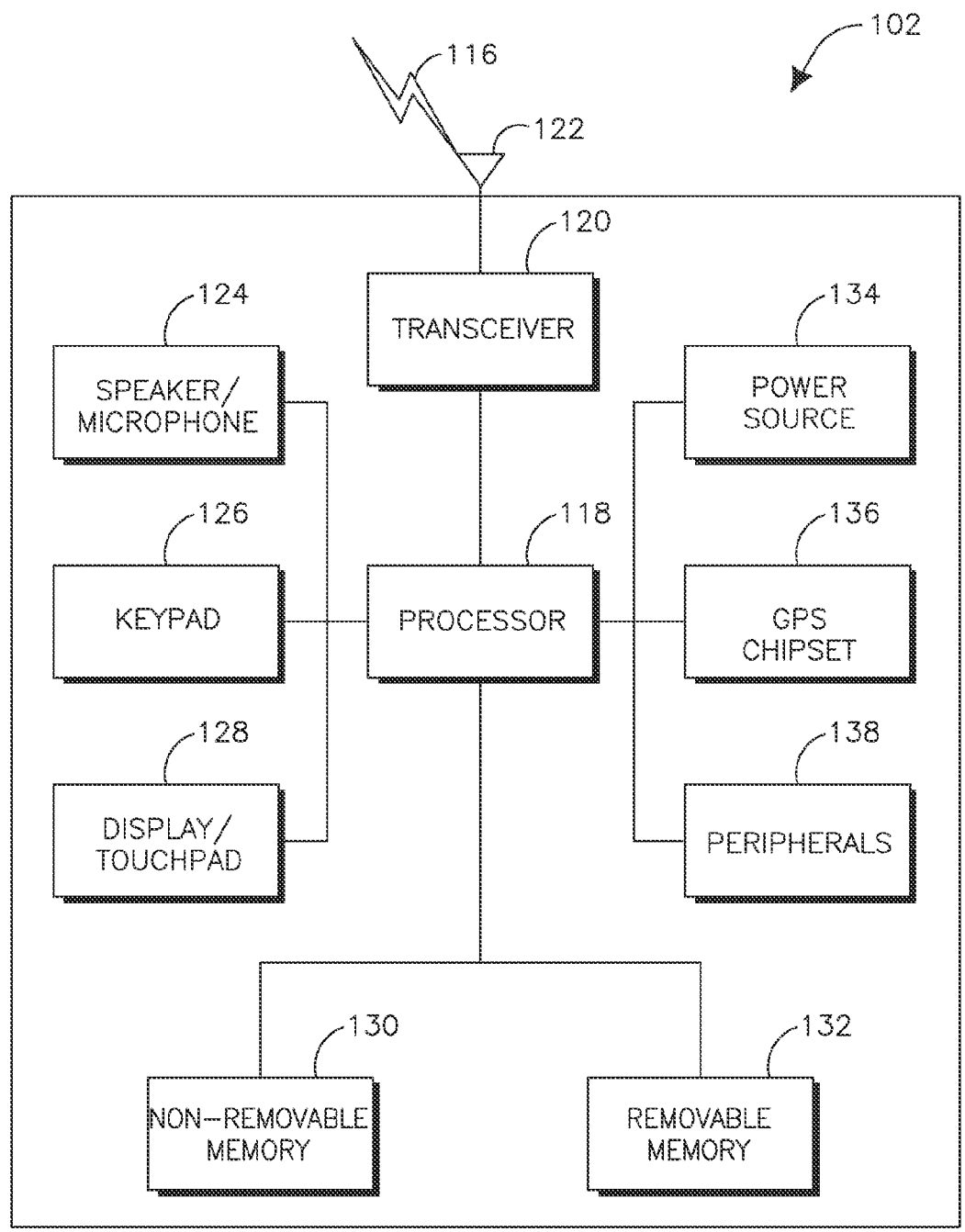
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
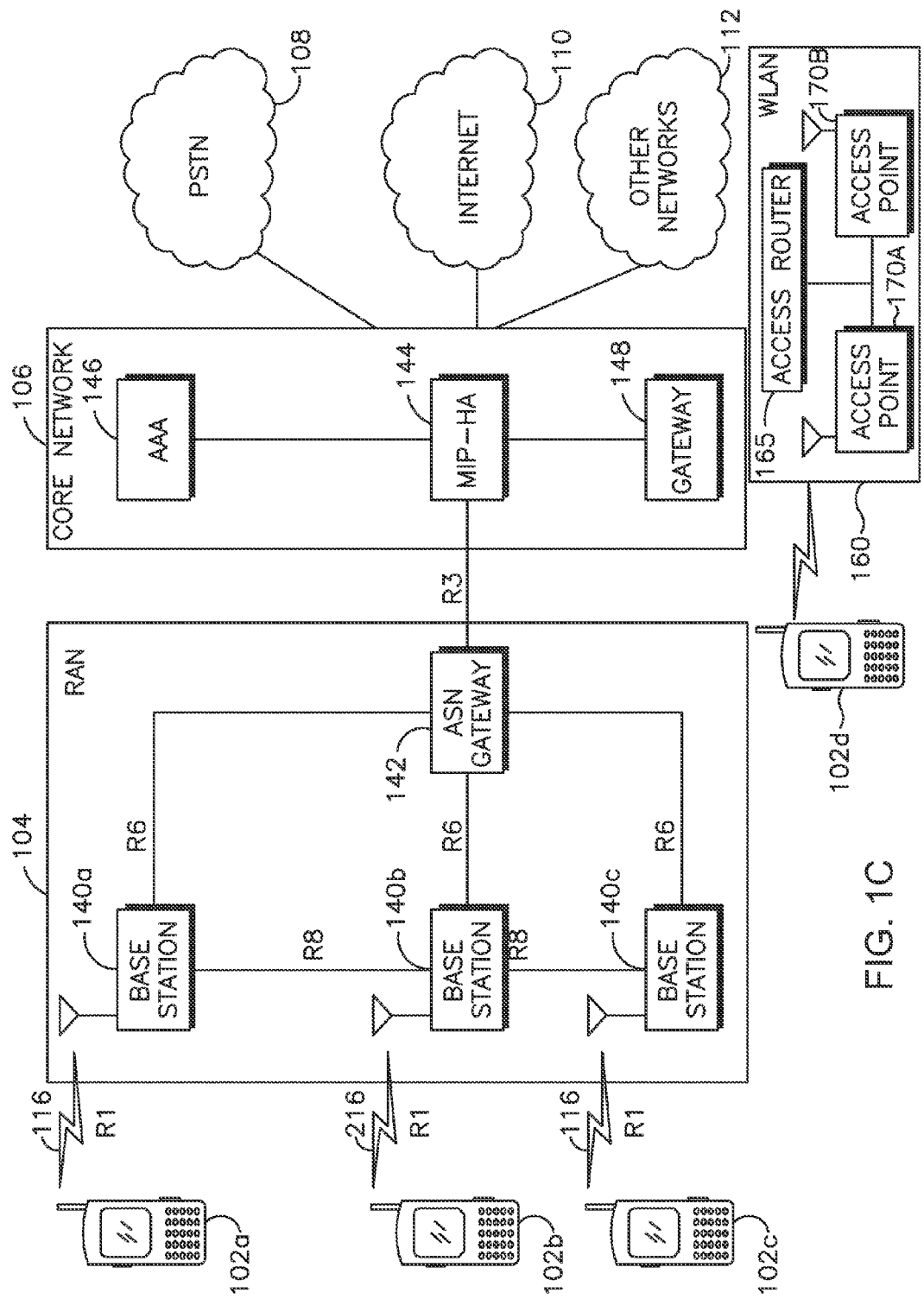
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

As described above, for at least some WLAN systems, WLAN STAs may need to transmit UL small frames frequently. Some more specific examples of such WLAN systems follow, in particular, as related to point coordination function (PCF), quality of service (QoS) hybrid coordination function controlled channel access (HCCA), power-save multi-poll (PSMP) and WLAN operation in spectrum allocated below 1 GHz (the Sub 1 GHz spectrum).

PCF is a technique that may be used in IEEE 802.11-based wireless local area networks (WLANs) whereby a point coordinator (PC) AP coordinates contention-free (CF) frame transfer within the network. PCF CF frame transfer may be based on a polling scheme, which may be controlled by a PC operating at the AP of the BSS.

FIG. 2 is a diagram of an example PCF frame transfer 200. The example PCF frame transfer 200 illustrated in FIG. 2 includes a contention-free repetition interval 202, which includes a contention-free period (CFP) 204 followed by a contention period 212. In an embodiment of PCF, the contention-free repetition interval 202 may be repeated to provide contention-free and contention-based access to a wireless medium over a period of time.

A PC may initiate a CFP 204 by including a CF parameter set element in a beacon 214. Every station that receives the beacon 214 may set their NAV 206 to the nominal start time of each CFP 204 to prevent non-polled transmissions.

The PC may poll CF-pollable STAs for UL transmissions using poll frames. In the example illustrated in FIG. 2, the PC waits a short interframe space (SIFS) period 210a after the beacon 214 to transmit its first poll frame 216. In an embodiment, the PC may use any one of a number of different frames as the poll frame, including, for example, a Data+CF-Poll frame, a Data+CF-ACK+CF-Poll frame or a CF-Poll frame. Use of these different types of poll frames may enable the PC to efficiently use poll frames to also transmit other data it has for transmission. For example, the PC may use the Data+CF-Poll frame to transmit DL data with the Poll frame if it has DL data to transmit. For another example, the PC may use the Data+CF-ACK+CF-Poll frame to transmit DL data and an acknowledgement (ACK) if it has DL data and an ACK to transmit. If the PC has no other data to transmit, it may simply transmit a CF-Poll frame. Acknowledgement of frames sent during a CFP (e.g., CFP 204) may be accomplished using one of Data+CF-ACK, CF_ACK, Data+CF-ACK+CF-Poll, or CF-ACK+CF-Poll frames if a data or null frame immediately follows the frame being acknowledged, thereby avoiding the overhead of separate ACK frames.

In response to being polled, a CF-Pollable STA may transmit UL frames without contention after a SIFS period. This may provide a higher utilization of the medium than for transmissions made under a distributed coordination function (DCF). In the example illustrated in FIG. 2, after the PC transmits the first poll frame 216, the polled STA waits a SIFS period 210b and then transmits one or more UL frames 218. After another SIFS period 210c, the PC may transmit its next poll frame 220, and after another SIFS period 210d, the polled STA may transmit one or more UL frames 222. After another SIFS period 210e, the PC may transmit its next poll frame 224. On a condition that the PC does not receive a response to the poll frame 224 within a priority interframe space (PIFS) period 208b, the PC may transmit its next poll frame 226. After another SIFS period 210f, the STA being polled may transmit one or more UL frames 228.

Once the PC has polled all of the STAs in the BSS, the PC may wait a SIFS period 210g and then transmit a CF-End frame 230 to indicate the end of the CFP 204. In response to receiving the CF-End frame 230, STAs may reset their NAVs 232, and the contention period 212 may begin. After the contention period 212, the PC may wait a SIFS period (e.g., SIFS period 208a) before initiating the next CF period, for example, by including a CF parameter set element in the beacon.

IEEE 802.11e systems may use an HCCA procedure to control channel access using a centralized controller. While both PCF and HCCA use centralized control to control channel access, HCCA and PCF are different at least in that HCCA may take place in both a CP or CFP and an HCCA STA may be granted a polled TXOP with the duration specified in a QoS(+)CF-Poll frame. STAs may transmit multiple frame exchange sequences within a given polled TXOP subject to the limit of the TXOP duration.

IEEE 802.11n systems may use a power-save multi-poll (PSMP) mechanism wherein a single PSMP frame may be used to schedule multiple STAs instead of using the direct QoS(+)CF-Poll used in HCCA. The PSMP may be more efficient than the QoS(+)CF-Poll in situations where STAs need to transmit a small amount of data periodically.

Figure 3:
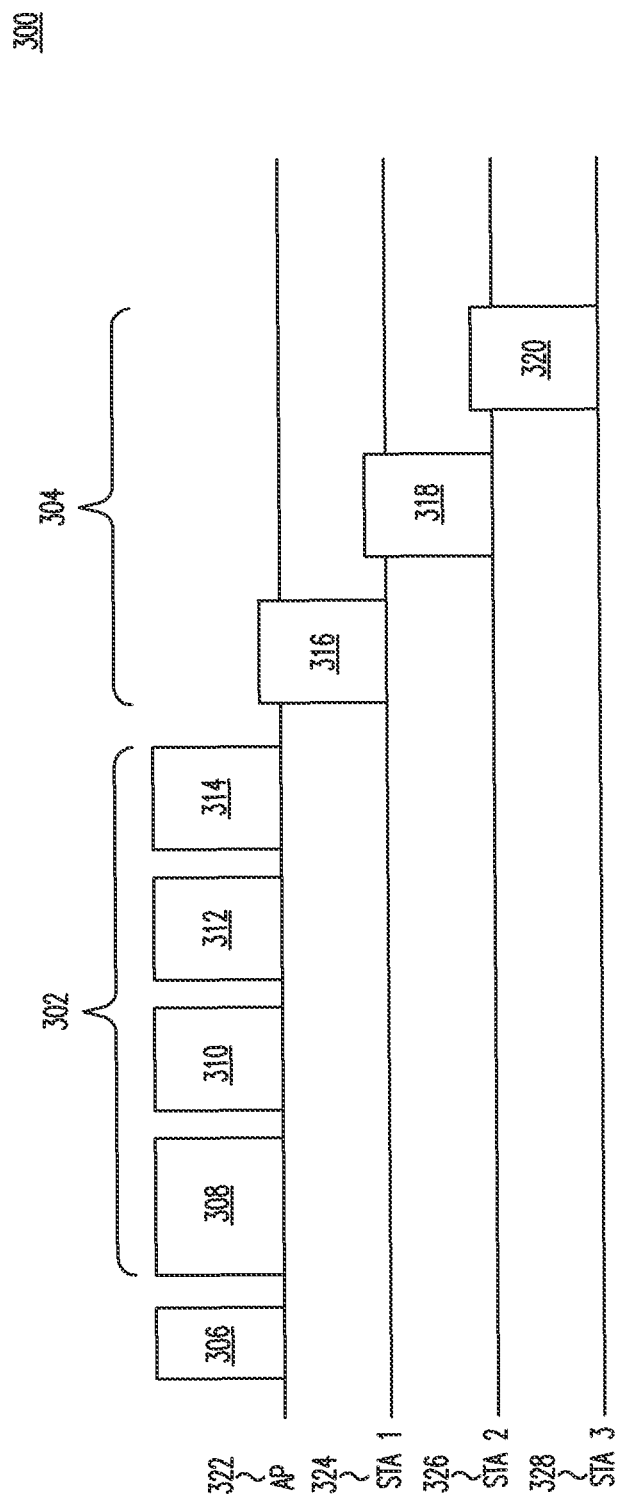
FIG. 3 is a diagram of an example power-save multi-poll (PSMP) operation.

FIG. 3 is a diagram of an example PSMP operation 300 for three STAs. In the example PSMP operation illustrated in FIG. 3, an AP 322 transmits a PSMP frame 306 that may be received by all of the STAS 324, 326 and 328 in the BSS. The AP may include in the PSMP frame 306 a schedule indicating to the STAs when they need to be awake to receive DL data frames during a DL phase 302 and the individual times at which each STA is allowed to begin transmitting UL data during a UL phase 304. In the example illustrated in FIG. 3, the DL phase 302 includes a broadcast period 308 followed by DL periods 310, 312 and 314 during which each of the respective STAs 324, 326 and 328 may receive DL data. The example UL phase 304 includes UL periods 316, 318 and 320 during which the STAs 324, 326 and 328 may respectively make UL transmissions.

Use of PSMP may reduce power consumption by STAs by providing the UL and DL schedule at the start of the PSMP phase so that each STA may shut down its receivers until needed in the DL phase and transmit only when scheduled during the UL phase without need to perform a clear channel assessment (CCA).

Some WLAN systems (e.g., WLAN systems built on the IEEE 802.11 Standard) are designed to operate in the Sub 1 GHz spectrum. Such spectrum may be quite limited in the size and bandwidth of the channels they comprise. In addition, such spectrum may be fragmented in that available channels may not be adjacent and may not be combined for larger bandwidth transmissions. Given the limitations of such spectrum, WLAN systems operating in it may only be able to support smaller bandwidths and lower data rates compared to high throughput/very high throughput (HT/VHT) WLAN systems (such as WLAN systems based on the IEEE 802.11n and/or 802.11ac Standards).

With respect to IEEE 802.11ah systems operable in Sub 1 GHz bands, an OFDM physical layer (PHY) that is operable below 1 GHz in license-exempt bands excluding the television white space (TVWS) band may be desirable. Further, enhancements to MAC may be desirable to supply PHY and coexistence with other systems (e.g., IEEE 802.15.4 and IEEE P802.15.4g systems). Even further, it may be desirable to optimize rate versus range performance (e.g., range of up to 1 km (outdoor)) and data rates greater than 100 Kbit/s).

Three use cases have been considered, including sensors and meters, backhaul sensor and meter data and extended range WiFi for cellular offloading.

Spectrum allocation in some countries may be quite limited. For example, in China, the 470-566 and 614-787 MHz band may only allow a 1 MHz bandwidth spectrum allocation. It may be desirable to support a 1 MHz only option in addition to supporting a 2 MHz option with a 1 MHz mode.

The IEEE 802.11ah PHY may operate below 1 GHz and is based on the IEEE 802.11ac PHY. To accommodate the narrow bandwidths required by IEEE 802.11ah, the IEEE 802.11ac PHY may be down-clocked by a factor of 10. While support for 2, 4, 8 and 16 MHz may be achieved by 1/10 down-clocking, support for the 1 MHz bandwidth may require a PHY definition with a Fast Fourier Transform (FFT) size of 32.

The IEEE 802.11ah sensors and meters use case requires support for up to 6,000 STAs within a single BSS. Devices such as smart meters and sensors have very different requirements pertaining to supported UL and DL traffic. For example, sensors and meters may be configured to periodically upload their data to a server, which will most likely be UL traffic only. Sensors and meters may also be queried or configured by the server. When a server queries or configures a sensor and meter, it may expect that the queried data should arrive within a set up interval. Similarly, the server/application may expect a confirmation for any configuration performed within a certain interval. These types of traffic patterns may be very different than traditional traffic patterns assumed for WLAN systems.

In the above examples, STAs, for example, may need to frequently transmit UL small frames including, for example, PS-Polls, industrial process automation (in which the frames may have an MSDU size of 64 bytes), web browsing clicking (in which the frames may have an MSDU size of 64 bytes) and VoIP (in which the frames may have an MSDU size of 64 bytes).

Further, a set of STAs may be scheduled to conduct medium access during a beacon interval, a beacon sub-interval or a time interval. If DCF-based access is used, much overhead may be associated with the transmission of UL packets, including DCF interframe space (DIFS), back-off, packet collisions and retransmission. The overhead may be particularly severe for small UL frames. If a contention-free method of UL transmission is used (e.g., where each STA is assigned a time slot to transmit their packets), there may not be much overhead since some STAs may have UL data packets to transmit while other STAs may simply transmit a PS-Poll frame to retrieve their buffered DL frames. Some portions of the assigned slots may remain idle after a STA completes its transmission until the start of the next time slot. These portions of assigned slots may, therefore, be wasted.

A set of STAs may be scheduled to conduct medium access in a beacon interval, beacon sub-interval or a given time interval in at least one of several ways. The AP may instruct the STAs to wake up during a certain interval using a management or control frame. An AP may include a positive traffic indication map (TIM) in its beacon or short beacon for STAs that transmit UL PS-Poll frames to retrieve their DL buffered packets. An AP may also include in its beacon indications of IDs, classes or other indicators of sets of STAs that are allowed to access a certain interval to conduct UL transmissions.

Speed frame exchange mechanisms have also been considered for IEEE 802.11. For example, a STA may indicate the presence of UL data using the more data field in the MAC header. For another example, for either UL or DL transmissions, a data frame may be used as a valid response frame. For another example, early ACK indication bits in the PLCP header may be used to indicate a medium reservation time associated with transmission of the data frame as a response frame to the current frame.

When a BSS includes a large number of STAs with bursty uplink (UL) traffic, a lot of overhead may be associated with the transmission and delivery of the UL packets. Some of this overhead may include the transmission of PHY convergence protocol (PLCP) and MAC headers, frame check sequences (FCSs), request to send (RTS)/clear to send (CTS) and acknowledgement (ACK) frames, time that a STA must wait to gain channel access (e.g., DIFS and backoff countdown), and retransmissions due to collisions. Overhead associated with transmitting data or a frame, such as a PS-Poll, that is short in length, may be particularly pronounced because the time associated with the transmission overhead may be several times longer than the actual transmission time of the data or packet itself. Consequently, a WLAN system may use significant resources to transmit the overhead and, thus, have low MAC efficiency. Accordingly, mechanisms may be desirable to reduce overhead and to improve MAC efficiency in WLAN systems.

Embodiments are described herein that may reduce overhead associated with transferring small data packets. In an embodiment, a wireless transmit/receive unit (WTRU), such as a STA, may transmit more detailed information about a packet it has for transfer, which may provide for higher MAC and power efficiency. In another embodiment, a frame check sequence (FCS) of variable length may be used, the dynamic length of the FCS depending, for example, on the length of the frame body in order to minimize overhead associated with transmission of UL small data frames. In another embodiment, WTRUs may use group-based channel contention to access the medium.

Figure 4A:
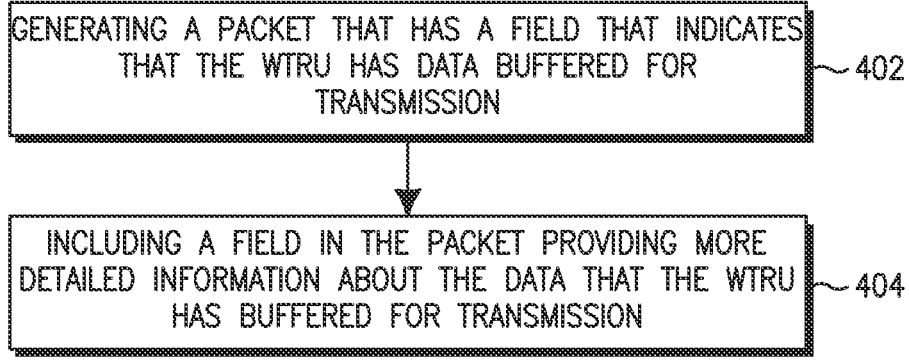
FIG. 4A is a flow diagram of an example method of transferring small packets.

FIG. 4A is a flow diagram 400A of an example method of transferring small packets, for example, in a wireless network, such as a WLAN. In the example illustrated in FIG. 4A, a WTRU, such as a STA, generates a packet that has a MAC header with a field that indicates that the WTRU has data buffered for transmission (402). The WTRU may include a field in the packet (e.g., in the MAC or PHY layer convergence procedure (PLCP) header) that provides more detailed information about the data that the WTRU has buffered for transmission (404).

The WTRU may indicate that it has data buffered for transmission using, for example, the More Data Field, in an MAC (e.g., an IEEE 802.11 MAC) or PLCP header. In an embodiment, the WTRU may include a bit in the More Data Field that indicates that the WTRU has data buffered for transmission. The more detailed information about the data that the WTRU has buffered for transmission may be indicated, for example, as an information element (IE) (e.g., buffered traffic IE),or in the MAC/PLCP header, as initial scrambling seeds or as a field or subfield (e.g., the buffered traffic indication field or subfield) of any management, control, data, or other type of frame. The more detailed information about the data that the WTRU has buffered for transmission may also be indicated, for example, by reusing any field or subfield, such as all or a subfield of the QoS control field in the MAC header.

In an embodiment, the WTRU may transmit the more detailed information to another WTRU or a base station (e.g., an AP), which may use the more detailed information to enable more efficient small packet transmission, for example, by assigning transmission opportunities (TXOPs) to WTRUs based on the more detailed information provided by WTRUs (e.g., STAs in the BSS).

The more detailed information about the data that the WTRU has buffered for transmission may include, for example, one or more of a time required for transmission of at least one packet that the WTRU has buffered for transmission, a number of packets that the WTRU has buffered for transmission, a size of each of the packets (e.g., in bytes) that the WTRU has buffered for transmission, or a total size of all of the packets that the WTRU has buffered for transmission. The time needed to transmit at least one packet of the data that the WTRU has buffered for transmission may include, for example, at least one of the estimated time or TXOP needed for the WTRU to transmit each packet that the WTRU has buffered for transmission or a total time or TXOP needed for the WTRU to transmit all of the UL or DL packets the WTRU has buffered for transmission (e.g., in microseconds or any other time unit).

Figure 4B:
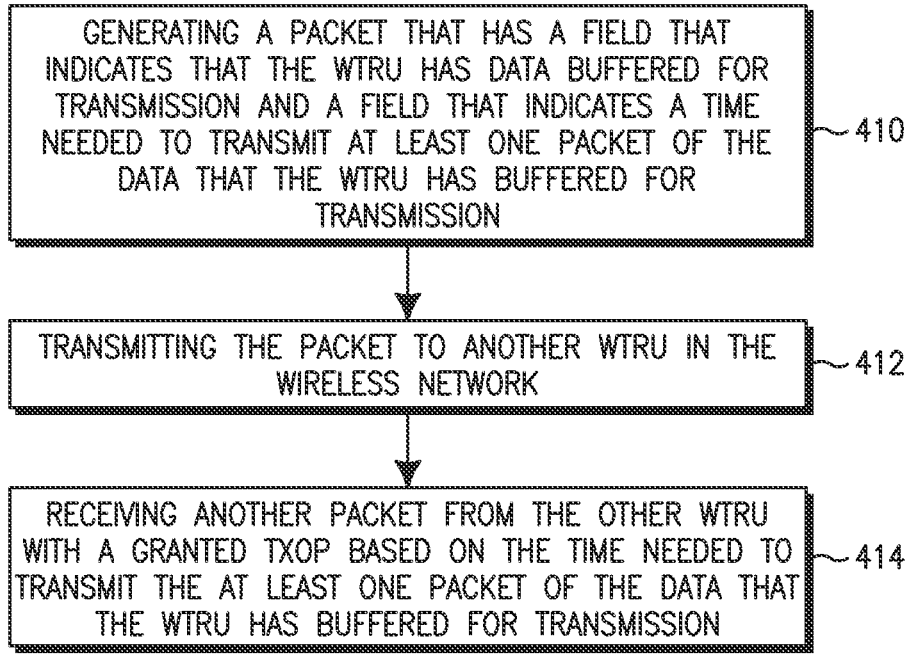
FIG. 4B is a flow diagram of another example method of transferring small packets.

FIG. 4B is a flow diagram 400B of another example method of transferring small packets, for example, in a wireless network, such as a WLAN. In the example illustrated in FIG. 4B, a WTRU (e.g., a STA) generates a packet that has a MAC header with a field that indicates that the WTRU has data buffered for transmission and a field that indicates a time needed to transmit at least one packet of the data that the WTRU has buffered for transmission (410). The WTRU may transmit the packet to another WTRU (e.g., an access point (AP)) in the wireless network (412). The WTRU may receive another packet from the other WTRU with a granted transmission opportunity (TXOP) based on the time needed to transmit the at least one packet of the data that the WTRU has buffered for transmission (414).

In an embodiment, the granted TXOP has a duration that is based on the time provided in the MAC header of the packet. The packet may be one of a power-save poll (PS-Poll) frame, an ACK frame, a data frame and a block acknowledgement (BA) frame.

In an embodiment, the WTRU may use new frame formats that include the buffered traffic indication field. Such new frame formats may include, for example, a PS-Poll+Buffered Traffic (BT) frame format, an ACK+BT frame format, a Data+BT frame format, a short ACK+BT frame format, a BA+BT frame format, or a short BA+BT frame format. In another embodiment, a bit may be used to indicate the presence of the buffered traffic indication field in the PLCP/MAC header or in any other part of any frame, such as a PS-Poll frame, an ACK frame, a data frame, a BA frame, a short ACK frame or a short BA frame. A buffered traffic indication field may also be included in, for example, PLCP tail bits or initial scrambling seeds of new or existing frames. In an embodiment, the more data bit in the UL/DL direction may be set to indicate the presence of a buffered traffic indication field.

The buffered traffic indication field may include detailed information about one or more of UL or DL traffic buffered at the transmitting WTRU. If the transmitting WTRU is a non-AP STA and the destination of the packet is the AP, then the buffered traffic indication field may be used to indicate the detailed information about the buffered UL packets. If the transmitting WTRU is an AP and the destination of the packet is a non-AP STA, then the buffered traffic indication field may be used to indicate the detailed information about buffered DL packets. If the transmitting WTRU is a non-AP STA and the destination of the packet is a non-AP STA, then the buffered traffic indication field may be used to indicate the detailed information on buffered peer-to-peer packets.

The buffered traffic indication field may also be used to indicate the detailed information on buffered broadcast or multicast packets for a particular set of STAs.

For frames such as PS-Poll, ACK, data and BA frames for an 802.11ah STA, one bit in the PLCP/MAC header (e.g., in the frame control field or the More Data field)may be used to indicate the presence of a buffered traffic indication field or sub-field. Such an indication may also be included, for example, in the PLCP tail bits or initial scrambling seeds. The buffered traffic indication field may include detailed information on buffered DL and/or UL packets, such as described above. Further, the buffered traffic indication field may be implemented as a whole field, or a subfield of, the QoS control field.

In an embodiment, a WTRU (e.g., a STA) that, for example, has received a positive TIM indication or has woken up from a sleep state and has obtained access to the medium, may transmit a data frame with a buffered traffic indication field if the WTRU has UL data to transmit. Here, the presence of a buffered traffic indication field may be indicated by a More Data bit. In an embodiment, the WTRU may wake up from a sleep state and, in response to waking up from the sleep state, transmit a PS-Poll frame with buffered traffic indication field, on a condition that the WTRU has UL data to transmit. Here, the presence of a buffered traffic indication field may be indicated by the More Data bit. The WTRU may transmit a PS-Poll frame without a buffered traffic indication field (or a buffered traffic indication field indicating 0 buffered packets) if the WTRU has no UL data to transmit. In an embodiment, the WTRU may transmit an aggregated MPDU (A-MPDU) or an aggregated MSDU (A-MSDU) that includes any combination of PS-Poll and data frames and a new type of frame that includes the buffered traffic indication field/IE.

Another WTRU or base station (e.g., an AP or another STA) may then perform one of the following. The other WTRU may transmit a data frame with a granted TXOP (e.g., in the duration field or in a subfield of the QoS control field in the MAC header) to the WTRU for UL only transmissions or for both UL and DL transmissions (when the other WTRU is an AP that also has DL packets to transmit) when receiving a data frame with a buffered traffic indication field. The data frame transmitted by the other WTRU may also include a buffered traffic indication field for any buffered DL packets at the other WTRU destined for the WTRU. The other WTRU may transmit an ACK/BA frame with a granted TXOP (e.g., in the duration field of the MAC header or the ACK/BA may include, or may be a subfield of, the QoS Control field in the MAC header for this purpose) to the WTRU for UL only transmissions or both UL and DL transmissions (when the AP also has DL packets to transmit) when receiving a data frame with a buffered traffic indication field. The ACK/BA frame transmitted by the other WTRU may also include a buffered traffic indication field for any buffered DL packets at the other WTRU destined for the WTRU. The other WTRU may transmit an A-MPDU or an A-MSDU that includes any combination of data frames, ACK/BA or any a new type of frame that includes either the granted TXOP or the buffered traffic indication field/IE for DL packets. The A-MPDU or A-MSDU may also include the information on the granted TXOP in its duration or QoS control field in the MAC header or any other field or subfields. All other WTRUs that receive the frames with the granted TXOP may go to sleep until the end of the TXOP for energy conservation. The other WTRU may also include schedule information on the granted TXOP, such as in the form of a Restricted Access Window (RAW) slot or a Target Wake Time (TWT), in any field or subfield of a packet such as in the MAC/PLCP header or in an RPS element.

In response to receiving the TXOP to transmit its UL frame, the WTRU may use the TXOP to complete its UL transmissions using any allowable transmission sequence, such as data frames, A-MPDUs, or A-MSDUs, with or without immediate ACK/BA. The other WTRU may acknowledge the receptions of these UL packets using ACK, short ACK, BA, short BA or data frames according to agreed ACK policies. At the end of its transmissions, the WTRU may transmit a CF-End frame to cancel its TXOP if there is sufficient time for the transmission of the CF-End frame. The other WTRU (e.g., an AP) may repeat the CF-End frame if it does not have any DL frames to transmit to the WTRU. The other WTRU it may also start transmitting the DL packets to the WTRU or any other WTRUs after a SIFS period from the CF-End frame.

In another embodiment, a WTRU (e.g., a STA) may have received a positive TIM indication or may wake up from a sleep state (e.g., at its target wake time (TWT)). When the WTRU obtains access to the medium, it may transmit a data frame with a buffered traffic indication field if the STA has UL data to transmit. The presence of a buffered traffic indication field may be indicated by the more data bit or other type of indication. The WTRU may transmit a PS-Poll frame, an NDP PS-Poll frame, or another type of trigger frame, with buffered traffic indication field, if the STA has UL data to transmit. The presence of the buffered traffic indication field may be indicated by the more data bit or other type of indication. The WTRU may transmit a PS-Poll frame without a buffered traffic indication field (or a buffered traffic indication field indicating 0 buffered packet) if the STA has no UL data to transmit. The WTRU may transmit an A-MPDU or A-MSDU including any combination of PS-Poll frames, data frames and/or a new type of frame that includes the buffered traffic indication field/IE.

A WTRU (e.g., an AP or another STA) that is the destination of the frame(s) transmitted by the STA may then transmit a data frame with a granted TXOP (e.g., in the Duration, in a subfield of the QoS Control field in the MAC header, or in another part of the PLCP/MAC header, frame body, etc.) to the STA for UL only transmissions, or for both UL and DL transmission (when the AP also has DL packets to transmit) when receiving a frame with a buffered traffic indication field. The he Data frame transmitted by the AP may also include a buffered traffic indication field for any buffered DL packets at the AP for the STA. The granted TXOP may be for the transmission of one UL and/or DL frame only. For example, the granted TXOP may be the TXOP for the transmission of one MSDU, which may be implemented as MAX_PPUD_Time.

The WTRU may transmit an ACK/BA frame with a granted TXOP (e.g., in the Duration Field of the MAC header, in another part of the PLCP/MAC header or frame body, or, alternatively, the ACK/BA may include a subfield of the QoS Control field in the MAC header for this purpose) to the STA for UL only transmissions or for both UL and DL transmissions (when the AP also has DL packets to transmit) when receiving a frame with a buffered traffic indication field. The ACK/BA frame transmitted by the AP may also include a buffered traffic indication field for any buffered DL packets at the AP for the STA. The granted TXOP may be for the transmission of one UL and/or DL frame only. For example, the granted TXOP may be the TXOP for the transmission of one MSDU, which may be implemented as a MAX_PPUD_Time.

The WTRU may transmit an A-MPDU or A-MSDU including any combination of data frames, ACK/BA frames or any a new type of frame that includes either the granted TXOP or the buffered traffic indication field/IE for DL packets. The A-MPDU or A-MSDU may also include the information on the granted TXOP in its duration or QoS control field in the MAC header or any other field or subfields. The WTRU may transmit a deferral packet, which may be a control, action, action without ACK frame, management or extension frame to inform the STA that one or more RAW/TWT/Access Window/Beacon interval/Beacon Sub-intervals is reserved for the STA, and the STA may need to be active during that period(s) of time to complete the UL transmission and/or DL reception. This may be because the amount of UL and/or DL traffic associated with the STA is large and may not be completely transmitted within the allocated slot/access window/RAW/Beacon (sub)interval so that additional slot(s)/TWT(s)/access window(s)/RAW(s)/Beacon (sub)interval(s) may need to be allocated. Such a frame may be implemented using a resource allocation frame, S1G Action/Extension frame, or any control, management, data, or extension or other type of frame, which may use RAW, TWT, or other type of scheduling IE and field/subfield for this purpose. Alternatively, the AP and STA may transmit their frame exchanges as normal, and the AP may transmit the deferral packet to the STA at the end of the current slot/TWT/access window/RAW/Beacon (sub)interval so that the AP and the STA may complete their UL and/or DL transmissions in a new slot/TWT/access window/RAW/Beacon (sub)interval.

All other STAs that receive the frames with the granted TXOP may go to sleep until the end of the TXOP for energy conservation. The STA, upon receiving the TXOP to transmit its UL frame, may then use the TXOP to complete its UL transmissions using any allowable transmission sequences, such as data frames, A-MPDUs, or A-MSDUs, with or without immediate ACK/BA. Any frames transmitted by the STA may include additional buffered traffic indication fields with updated information on the amount of buffered UL traffic, which may take into account any buffered UL information that has been transmitted/successfully delivered as well as any packets that newly arrived for UL transmission.

The AP may acknowledge the receptions of these UL packets using ACK, short ACK, BA or short BA, data according to the agreed ACK policies. Similarly as for the STA, the frames transmitted by the AP may include additional buffered traffic indication fields with updated information on the amount of buffered DL traffic, which may take into account any buffered DL information that has been transmitted/successfully delivered as well as any packets that newly arrived for DL transmission.

The STA, at the end of its transmissions, may transmit a CF-End frame to cancel its TXOP if there is sufficient time for the transmission of the CF-End frame. The AP may repeat the CF-End frame if it does not have any DL frames to transmit to the STA. It may also start transmitting the DL packets to the STA or any other STAs after a SIFS time from the CF-End frame.

If the STA has received a deferral frame from the AP instructing it to use a different slot(s)/TWT(s)/access window(s)/RAW(s)/Beacon (sub)interval(s) for its UL and/or DL traffic, it may sleep until that time. Once it wakes up, it may follow the channel access policy according to the AP's instructions to access the channel. The STA may start the frame exchange sequence using a PS-Poll, NDP PS-Poll, or any other type of trigger frame, such as data, which may include a buffered traffic indication field. The AP may start the frame exchange sequence using any type of frames, such as data, control, management or extension frames, which may also include a buffered traffic indication field.

In another embodiment, a frame check sequence (FCS) of variable length may be used, the dynamic length of the FCS depending, for example, on the length of the frame body in order to minimize overhead associated with transmission of UL small data frames. A standard FCS field may be 4 bytes long, which may not always be necessary for short frames. Accordingly, use of a dynamic FCS field may reduce transmission overhead associated with a packet or frame that is short in length.

The length of the FCS field, as well as the design of the FCS field, may be indicated in the PLCP/MAC header (e.g., in the SIG, SIGA and/or SIGB field of the PLCP header or in the frame control field in the MAC header), may be included in the initial scrambler seed or may be implicitly defined. With reference to FIG. 4B, in an embodiment, the packet generated by the WTRU in 402 may further include a field that indicates a length of a dynamic FCS field that is included in the packet. In an embodiment, the length of the field may be indicated in the PLCP/MAC header as a number of bytes (e.g., 1-N). For example, the FCS field may have a length that is less than 4 bytes. The design of the FCS field may be a new FCS using a new polynomial or may be punctured from the existing FCS sequence as well as puncture rate.

In addition, the use of a short/dynamic FCS length for a frame may be pre-negotiated by either single user frame compression procedures or intra-group data/frame compression procedures. The length of the FCS field and the type of FCS construction may be abstracted as a part of the specification of a particular compressed data/frame type between a transmitting and a receiving STA or among a group of STAs. The type of compressed data/frame with a particular FCS length or construction or other properties may be indicated in the PLCP/MAC header (for example in the SIG, SIGA and SIGB field of the PLCP header or in the frame control field in the MAC header), by the initial scrambler seed or it is implicitly defined.

A WTRU may indicate that it has the capability of using a dynamic FCS field length in, for example, the capability field or any other field, subfield or IE included in the beacon. Or the WTRU may indicate its capability for dynamic FCS field length in Probe Request and Probe Response frames, Association Request and (Re)Association Response frames, or any other type of management, control or extension frames. The capability of using dynamic FCS length may be exchanged at the time of association and at any other times. The usage of dynamic FCS length or shortened FCS length in a particular frame may be indicated by one or more bits in the PLCP header.

In response to receiving a frame that indicates that the frame has dynamic FCS, the receiving WTRU (e.g., STA) may obtain the FCS field according to the FCS length specified, check the correctness of the frame and decide to either discard the frame as incorrectly received or relay the frame to higher layers. If the FCS specification is pre-negotiated (e.g., using a single user or group data/frame compression procedure), then the receiving WTRU may search for a pre-negotiated record for FCS specifications associated with the particular type of compressed data/frame.

Figure 5A:
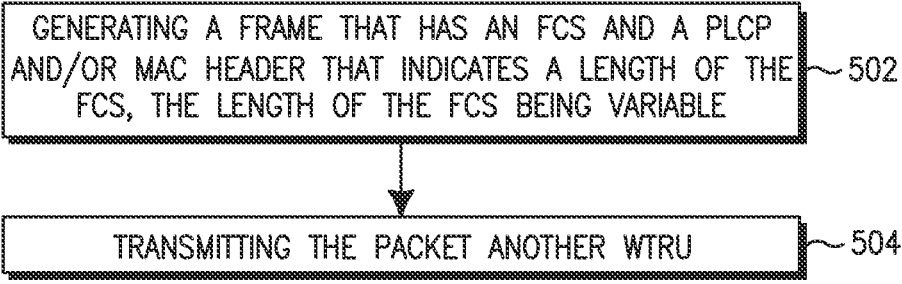
FIG. 5A is a diagram of an example method of transferring small packets using a variable-length frame check sequence (FCS)

FIG. 5A is a diagram of an example method 500A of transferring small packets using a variable-length FCS. In the example illustrated in FIG. 5A, a WTRU (e.g., a STA) generates a frame that has an FCS and a PLCP and/or MAC header that indicates a length of the FCS (502). The length of the FCS may be variable. The WTRU may then transmit the packet to another WTRU (e.g., a different STA or an AP) (504).

Figure 5B:
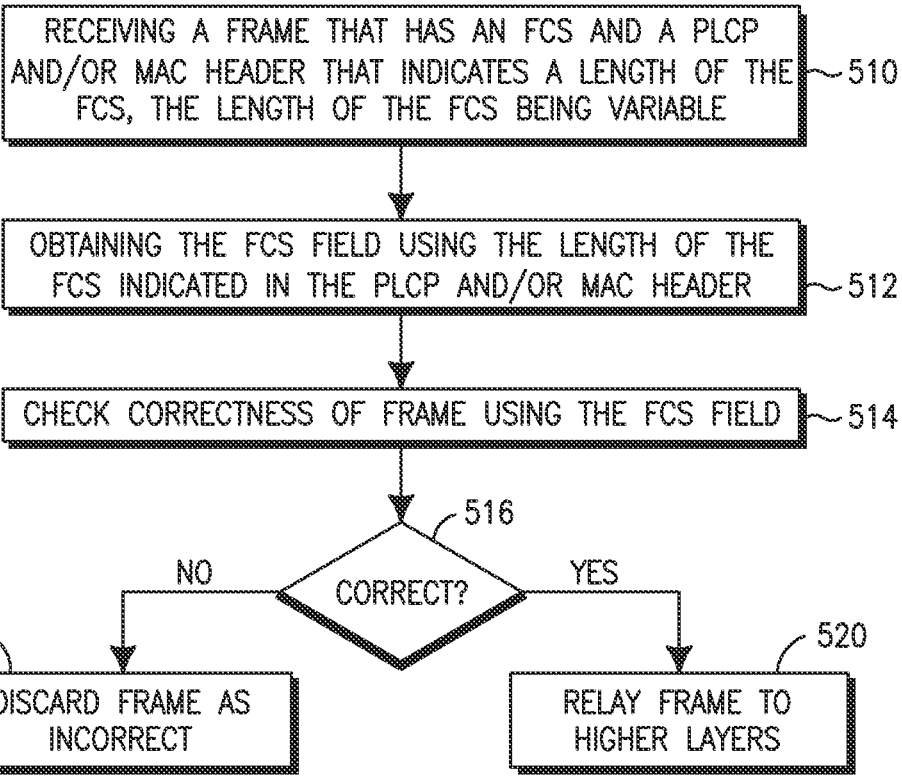
FIG. 5B is a diagram of another example method of transferring small packets using a variable-length FCS.

FIG. 5B is a diagram of another example method 500B of transferring small packets using a variable-length FCS. In the example illustrated in FIG. 5B, a WTRU or base station (e.g., an AP or a STA) receives a frame (e.g., from another WTRU such as another AP or STA) that has an FCS and a PLCP and/or MAC header that indicates a length of the FCS (510). The length of the FCS may be variable. The WTRU or base station may obtain the FCS field from the packet using the length indicated in the PLCP and/or MAC header (512). The WTRU or base station may check the correctness of the frame using the FCS field obtained from the packet (514). On a condition that the WTRU or base station determines that the frame is correct (516), the WTRU or base station may relay the frame to higher layers (520). On a condition that the WTRU or base station determines that the frame is not correct, the WTRU or base station may discard the frame (518).

In an embodiment, WTRUs may use group-based channel contention to access the medium. Here, STA-to-STA grants may be provided for medium access for UL transmissions in order to minimize overhead associated with transmitting UL small data frames.

In group-based channel contention, the set of WTRUs (e.g., STAs) that are allowed to conduct UL transmissions (e.g., PS-Polls, data frames or other types of frames) may be divided into one or more groups referred to as contention groups (CGs). Accordingly, instead of each individual WTRU competing for the channel, for example, one WTRU in each of the CGs may be selected to conduct channel contention for the CG. For example, if 20 STAs are scheduled to conduct UL medium access in an interval, the set of 20 STAs may be divided into five CGs of four STAs each. One STA in each of the five CGs may be selected to be the contender for the CG and is responsible for starting medium access for the entire CG. Thus, instead of 20 STAs competing for medium access, only five contenders may compete for medium access, which may significantly reduce the probability of collision and retransmissions. Once a contender of a CG gains access to the medium, it may be implicit that the entire CG gains access to the medium, and the transmission period for that CG may commence.

In addition, the group-based contention may have the added benefit of potentially reducing the amount of UL transmissions in event-driven STAs. For example, if some fire sensors located in the same geographical area are grouped into a CG, and if the contender has gained access to the channel and transmitted its packet reporting an event (e.g., either a fire has been detected or has not been detected), the other STAs in the same CG may send a compressed version of a frame to report that they are reporting the same data. In this way, the medium occupation time caused by STAs in the CG transmitting frames may be significantly reduced, in addition to the reducing collisions and retransmissions.

The role of CG contender may be assigned to a WTRU in a contention group in at least one of several ways. In an embodiment, a base station or WTRU, such as an AP, may assign a WTRU, such as a STA, in a CG to be the contender, either explicitly in a management, control or other type of frame or implicitly (e.g., implied by a positive TIM indication). For example, an AP may pre-negotiate with STAs that positive TIM indications may be divided into several CGs with each CG including N STAs. The N STAs that are associated with the first N positive TIM indications may be in CG1, and the STA that is associated with the first positive TIM indication may be the contender for CG1. Similarly, the next N STAs that are associated with the $(N+1)^{th}$ to the $2N^{th}$ positive TIM indications may be in CG2, and the STA that is associated with the $(N+1)^{th}$ positive TIM indication may be the contender for CG2.

In another embodiment, a CG may have a particular STA assigned to be its contender all the time. Alternatively, the STAs in a CG may rotate to take on the role of the contender of the CG. Here, the STAs may follow a pre-determined order to become the contender (e.g., the order of the MAC addresses or association IDs (AIDs) for the STAs). In another embodiment, a contender may explicitly hand over the role of the contender to another STA in the CG.

When competing for the CG, the contender may use one or more of a different access category or a different set of enhanced distributed channel access (EDCA) parameters. For example, new access categories may be defined for group contention, which may have higher priorities than STA-based access categories. Such new access categories may include AC_GP_VO (group access category for voice traffic), AC_GP_VI (group access category for video traffic), AC_GP_BE (group access category for best effect traffic), AC_GP_BK (group access category for background traffic), AC_GP_MG (group access category for group management and/or control frames), AC_GP_SEN (group access category for sensors and/or meters), AC GP Emergency (group access category for reporting an emergency, such as fire, intruder detections or patient heart attacks), AC_GP_PS (group access category for power save STAs), AC_GP_LS (group access category for power saving STAs that are long sleepers and strive for a long battery life) and AC_GP_FILS (group access category for fast initial link setup, for example for a group of STAs moving together). These access categories may be explicitly or implicitly defined by using a separate set of local EDCA parameters. In addition, these access categories may have higher or lower priority than existing access categories.

FIG. 6 is a diagram of an example of group-based channel contention 600. In the example illustrated in FIG. 6, a group-based channel contention period may be preceded by a beacon, a short beacon or other type of management, control or extension frame 602 in which a base station or WTRU (e.g., an AP) announces a set of WTRUs that are allowed medium access in the coming interval. In an embodiment, the set of WTRUs allowed to access the medium may also be scheduled to wake up at the beginning of group-based channel contention. In an embodiment, the WTRUs in CGs that participate in group-based channel contention may be assigned to a special interval where other WTRUs are not allowed to transmit. These WTRUs may also conduct group-based channel contention in intervals where other WTRUs conduct normal (e.g., STA-based) channel contention, with or without different EDCA parameters based on the traffic priority, STA types, etc.

At the start of a group-based contention period, the contenders for each CG may start competing for the channel, for example, following normal (E)DCF procedures, either with or without different EDCA parameters. In the example illustrated in FIG. 6, after a DIFS period 604 and backoff slots 616, the contender for CG1 gained access to the channel and transmits its first packet 618 (e.g., UL or peer-to-peer). The first packet may be a PPDU of the regular format or a short format. It may also include an MSDU, an A-MPDU, or an A-MSDU. The first packet from the contender may include one or more of the following information in its PLCP/MAC header, initial scrambling seeds or the frame body: information about the CG (e.g., the ID of the CG or order of STAs in the CG), NAV information to reserve the medium for the CG1 transmission period 606 or UL or peer-to-peer packets (e.g., PS-Poll or data frames to the AP).

WTRUs in CGs that do not have access to the medium may sleep for a duration of NAV settings included in the first packet from the contender of the CG that obtained medium access (e.g., the contender for CG1 in FIG. 6). The NAV value may be calculated to be some minimal value so that the remaining CGs will wake up in time at the end of the current CG transmission period to prevent much medium idle (and therefore wasted) time.

The CG transmission period for CG1 606 follows the first packet 618 from the contender of CG1. After the transmission period for CG1 606 ends, the contenders of the other CGs may wait a DIFS period 608 and then start to compete for access to the medium for their respective CGs following, for example, normal (E)DCF procedures, with or without EDCA parameter sets based on the traffic priority, STA types, etc. In the example illustrated in FIG. 6, the contender for CG5 gained access to the channel and transmits its first packet 620. The CG transmission period for CG5 610 follows the first packet 620 from the contender of CG5. After the transmission period for CG5 610 ends, the contenders of the other CGs may wait a DIFS period 612 and then start to compete for access to the medium for their respective CGs. This time, in the example illustrated in FIG. 6, the contender for CG2 gained access to the channel and transmits its first packet 622. The CG transmission period for CG2 614 follows the first packet 622 from the contender of CG2. This process may be repeated in a similar manner.

FIG. 7 is a diagram of another example of group-based channel contention 700. In the example illustrated in FIG. 7, a group-based channel contention period may be preceded by a beacon, a short beacon or other type of management control frame 702 in which a base station or WTRU (e.g., an AP) announces the ID of the contender of CG1 or the ID of CG1. The contender of CG1 may start transmitting its first packet 716 a SIFS period 704 after the end of the beacon, short beacon or other type of management, control or extension frame 702. In an embodiment, the contender for CG1 may also start transmitting immediately at a scheduled starting time of the group-based channel contention period.

After the transmission period for CG1 706 ends, the contenders of the other CGs may wait a DIFS period 708 and then start to compete for access to the medium for their respective CGs following, for example, normal (E)DCF procedures, with or without EDCA parameter sets based on the traffic priority, STA types, etc. In the example illustrated in FIG. 7, the contender for CG5 gained access to the channel and transmits its first packet 718. The CG transmission period for CG5 710 follows the first packet 718 from the contender of CG5. After the transmission period for CG5 710 ends, the contenders of the other CGs may wait a DIFS period 712 and then start to compete for access to the medium for their respective CGs. This time, in the example illustrated in FIG. 6, the contender for CG2 gained access to the channel and transmits its first packet 720. The CG transmission period for CG2 714 follows the first packet 720 from the contender of CG2. This process may be repeated at least until each CG has had a chance to access the medium.

FIG. 8 is a diagram of another example of group-based channel contention 800. In the example illustrated in FIG. 8, a group-based channel contention period may be preceded by a beacon, a short beacon or other type of management, control or extension frame 802 in which a base station or WTRU (e.g., an AP) announces the IDs of the CGs as well as the order of transmission of the CGs. According to the announced order, the contender for CG1 may start transmitting its first packet 816 a SIFS period 804 after the end of the beacon, short beacon or other type of management control frame 802. In an embodiment, the contender for CG1 may begin transmitting immediately at a scheduled starting time for the group-based channel contention period. At the end of the transmission period of the Nth transmitting CG, the contender for the (N+1)th CG may gain access to the medium when receiving a packet transmitted by a STA in the Nth CG indicating that it is the last packet in the transmission period of the Nth transmitting CG (e.g., setting the end-of-service-period (EOSP) bit in the MAC header to 1 and/or the more data bit to 0) or through inter-group transmission grant (described in more detail below). The contender for the (N+1)th CG may start transmitting a SIFS time after the end of the last packet of the transmission period of the Nth transmitting CG or a SIFS period after the end of the packet including the inter-group transmission grant.

In the example illustrated in FIG. 8, at the end of the transmission period for CG1 806, the contender for CG2 gains access to the medium when receiving a packet (not shown) transmitted by a STA in CG1 indicating that it is the last packet in the transmission period for CG1 806. The contender for CG2 starts transmitting its first packet 818 a SIFS period 808 after the end of the last packet of the transmission period for CG1 806 or a SIFS period 808 after the end of the packet including the inter-group transmission grant. At the end of the transmission period for CG2 810, the contender for CG3 gains access to the medium when receiving a packet (not shown) transmitted by a STA in CG2 indicating that it is the last packet in the transmission period for CG2 810. The contender for CG3 starts transmitting its first packet 820 a SIFS period 812 after the end of the last packet of the transmission period for CG2 810 or a SIFS period 812 after the end of the packet including the inter-group transmission grant. This process may be repeated until every CG has had its turn to access the medium according to the announced order.

Once the first packet is transmitted by the contender of a CG, the transmission period of the CG commences. During the transmission period for a given CG, the WTRUs in the CG may access the medium using Intra-CG transmission grant and surrogate polling.

For intra-CG transmission grant and surrogate polling, it may be assumed that all STAs in a CG always have a UL packet to transmit. If a CG is formed by WTRUs with positive TIM indications in the beacon or short beacons, all WTRUs need to transmit PS-Polls to retrieve buffered DL data packets. If the CG is formed by WTRUs that do not listen to the TIM indication or beacon, the WTRUs need to transmit PS-Polls to the AP to inquire about the presence of buffered data. If a WTRU in a CG has UL data to transmit, it may transmit the data to another WTRU or a base station (e.g., an AP) when it is being polled or has received an intra-CG transmission grant. If a WTRU has UL data to transmit and does not belong to a CG, it may compete for medium access using normal DCF procedures with the same or different ECDA parameters.

The CG transmission period may begin after the contender for a CG (e.g., STA 1) has transmitted its first packet. This first packet may be one of many types of frames, as described above. For example, the first packet from STA1 may be a PS-Poll or any other type of UL packet transmitted to the AP. In response to the first packet from STA1, the AP may transmit one of a DL data packet for STA1, a frame indicating that there is no buffered packet for STA1 or an ACK frame (in which case the AP may transmit the DL data packet for STA1 later).

When the AP responds to the PS-Poll or any other type of UL packet from STA1 with an ACK frame, the AP may transmit the DL data packet for STA1 after a SIFS interval following the ACK frame, in response to which STA1 may acknowledge the reception of the DL data packet using frames such as short ACK, ACK, BA, ACK+Intra-GP-TX-GT (ACK and Intra-Group Transmission Grant), ACK+SUR-Poll (ACK and Intra-Group Surrogate Poll), data frames, or ACK+EndCGTX (ACK and End-CG-TransmissionPeriod).

When the AP responds to the PS-Poll or any other type of UL packet from STA1 to the AP with a frame indicating that there is no buffered packet for STA1, upon receiving the ACK frame from the AP, STA1 may then transmit after a SIFS interval an Intra-CG-TX-GT frame to provide an Intra-group transmission grant for the next STA in the CG (e.g., STA2). Alternatively, STA1 may also transmit a Sur-Poll frame to conduct surrogate polling for STA2. If the current STA is the last transmitting STA in the CG, the STA may then transmit an EndCGTX frame to announce the end of the CG Transmission Period. Alternatively, if STA1 has indicated in its first UL packet that it does not have any more UL packets to transmit, instead of a short or regular ACK or BA, the AP may transmit an ACK+Poll or an ACK-Intra-GP-TX-GT frame to grant the medium access to the next STA in the CG (e.g., say STA2) to transmit any UL packet, such as PS-Poll or data.

When the AP responds to the PS-Poll (or any other type of UL packet from STA1) with a DL data frame, STA1 may respond with a data frame if it has more UL data to transmit or it may acknowledge the reception of DL data frames with a short or normal ACK or BA if the AP indicates that it has more DL data to transmit to STA1. If the AP indicates that it has no more DL data to transmit to STA1, STA1 may acknowledge receipt of the DL data frames with ACK+Intra-GP-TX-GT in order to provide an intra-group transmission grant to the next STA in the CG (e.g., STA2). STA1 may also transmit an ACK+SUR-Poll to acknowledge receipt of the DL data frame as well as to conduct surrogate polling for STA2. If the AP indicates that it has no more DL data to transmit to STA1, STA1 may acknowledge receipt of the DL data frames with an ACK-EndCGTX frame in addition to indicating the end of the CG transmission period. In different embodiments, the transmission order of STAs in a CG may be fixed or may be rotating according to a pre-arranged or random schedule.

The design of the frames Intra-CG-TX-GT, SUR-Poll, EndCGTX, ACK+Intra-CG-TX-GT, ACK+SUR-Poll, ACK+EndCGTX may be implemented as new subtypes of management frames, control frames, extension frames or new type of frames. They may also be implemented as action frames or action no ACK frames. For example, they may be implemented as an action frame or an action no ACK frame of the type HT, VHT, TV high throughput (TVHT), IEEE 802.11ah, High Efficiency WLAN (HEW), or new type of action frame. They may also be implemented as a short frame where all information is carried in the PLCP header portion.

With respect to Intra-CG-TX-GT frames, these frames may be sent by a WTRU (e.g., aSTA or AP) to another WTRU (e.g., the AP or the next STA (e.g., STA2)) in the CG for which the intra-group transmission grant is provided. If the frame is the transmitted to the next STA in the CG, the AP may choose to repeat the Intra-CG-TX-GT frame after a SIFS period to prevent hidden nodes in the BSS or OBSS. If the Intra-CG-TX-GT is sent to the AP, it may include an explicit ID of STA2, such as an AID, MAC address, or other type of ID that the AP and the transmitting STA have agreed upon, in its PLCP/MAC header, frame body, initial scrambler sequence, etc. For example, the ID of STA2 may be included in the Address 3 and/or Address 4 field of the MAC header. A bit in the PLCP or MAC header (e.g., in the frame control field) may be used to indicate that Address 3 or Address 4 fields are in use and/or, in combination of the frame type/subtype/action frame category field, indicate that address 3 or address 4 fields are used for the ID of the STA receiving the intra-group transmission grant. If the Intra-CG-TX-GT frame is transmitted by the AP, then frames such CF-Poll, PS-Poll, Data+Poll, etc., may be reused as the Intra-CG-TX-GT frame. In response to receiving the Intra-CG-TX-GT frame from a peer STA in the CG or from the AP, depending on the particular protocol, the STA may start transmitting UL or peer-to-peer frames after a SIFS period. If the Intra-CG-TX-GT frame is received from a peer STA in the CG, and the AP is configured to repeat the Intra-CG-TX-GT, then the STA receiving the intra-group transmission grant may only start transmitting a SIFS period after receiving the Intra-GP-TX-GT frame from the AP.

With respect to SUR-Poll frames, these frames may be transmitted from a STA in a CG to the AP to inquire about the presence of any buffered DL frames for another peer STA (e.g., STA2) in the CG. The SUR-Poll frame may include an explicit ID of STA2, such as AID, MAC address, or other type of IDs that the AP and the transmitting STA have agreed upon, in its PLCP/MAC header, frame body, initial scrambler sequence, etc. For example, the ID of STA2 may be included in the Address 3 and/or Address 4 field of the MAC header. A bit in the PLCP or MAC header (e.g., in the frame control field) may be used to indicate that Address 3 or Address 4 fields are in use and/or, in combination of the frame type/subtype/Action frame category field, indicate that address 3 or address 4 fields are used for the ID of the STA for which the transmitting STA is conducting the surrogate polling. Upon receiving the SUR-Poll for STA2, the AP may start transmitting DL frames for STA2 immediately. Alternatively, the AP may first respond with an ACK frame and then start transmitting a DL frame for STA2 after a SIFS time. The AP may also respond with a frame, such as a poll to STA2 indicating that there are no frames buffered for STA2, while allowing STA2 to transmit any UL frames it may have.

With respect to EndCGTX frames, these frames may be transmitted by either a STA in a CG or by the AP to indicate that the current CG transmission period ends. This frame may be sent to the AP or may be sent to a broadcast or multicast address. It may also be sent to the AP/contender of the next CG functioning as an inter-group transmission grant. Upon receiving the EndCGTX frame, the AP and the STAs, as well as STAs in the CG, will follow channel access rules to compete for the medium.

With respect to ACK+Intra-GP-TX-GT frames, these frames may be largely equivalent the Intra-GP-TX-GT frames. A difference, however, may be that this frame also acknowledges the reception of the frame that is sent to the transmitting STA immediately before the transmission of the Intra-GP-TX-GT frame. The ACK+Intra-GP-TX-GT frame may also be implemented in such a way that it includes a block ACK field, similar to the field in a BA, to provide block ACKs to a sequence of frames sent to the transmitting STA.

With respect to ACK+SUR-Poll frames, these frames may be largely equivalent to the SUR-Poll frame. The only difference is that this frame may also acknowledge receipt of the frame that is sent to the transmitting STA immediately before the transmission of the ACK+SUR-Poll frame. The ACK+SUR-Poll frame may also be implemented in such a way that it includes a block ACK field, similar to the field in a BA, to provide block ACKs to a sequence of frames sent to the transmitting STA.

With respect to ACK+EndCGTX frames, these frames may be largely equivalent to the EndCGTX frame. The only difference may be that this frame also acknowledges receipt of the frame that is sent to the transmitting STA immediately before the transmission of the ACK+EndCGTX frame. The ACK+EndCGTX frame may also be implemented in such a way that it includes a block ACK field, similar to the field in a BA, to provide block ACKs to a sequence of frames sent to the transmitting STA.

FIG. 9 is a diagram of an example Intra-CG transmission grant and surrogate polling procedure 900. In the example illustrated in FIG. 9, the contender for a given CG (STA1) may transmit its first packet 908 a SIFS period 904 after the beacon 902. The CG transmission period 906 for the given CG begins after the contender for the CG (STA 1) has transmitted its first packet. Here, this first packet is a PS-Poll packet 902. In response to the first packet from STA1, the AP transmits a DL data packet for STA1 910. The AP or STA1 then provides an intra-group transmission grant 928 to the next STA (STA2) by transmitting an ACK+Intra-GP-TX-GT frame 912 to STA2. This frame provides the intra-group transmission grant to STA2 and also acknowledges receipt of the frame that was sent to STA1 immediately before. In response to receiving the ACK+Intra-GP-TX-GT frame 912, STA2 transmits its UL data 914 (e.g., after a SIFS period).

The AP may then provide an intra-group transmission grant 930 to the next STA (STA3) by transmitting an ACK+Intra-GP-Poll frame 916 to STA 3, also acknowledging the UL data 914 transmitted by STA 2 immediately before and polling STA 3 for DL data. In response to receiving this frame, STA3 transmits its UL data 918 (e.g., after a SIFS period) and also receives DL data 920 from the AP. STA3 may then provide an intra-group transmission grant 932 to the next STA (STA4) by transmitting an ACK-SUR-Poll frame 922 to the AP, inquiring about the presence of any buffered DL frame for STA4 and acknowledging reception of the DL data 920. In response to receiving the ACK-SUR-Poll frame 922, the AP transmits DL data 924 to STA 4. When this is complete, STA4 transmits an ACK+EndCGTX frame 926, acknowledging receipt of the DL data 924 and indicating that the CG transmission period 906 ends.

At the end of a CG transmission period, inter-group transmission grant and surrogate polling may occur. Procedures and frame designs for inter-group transmission grant and surrogate polling are similar to those for intra-group transmission grant and polling.

Figure 10:
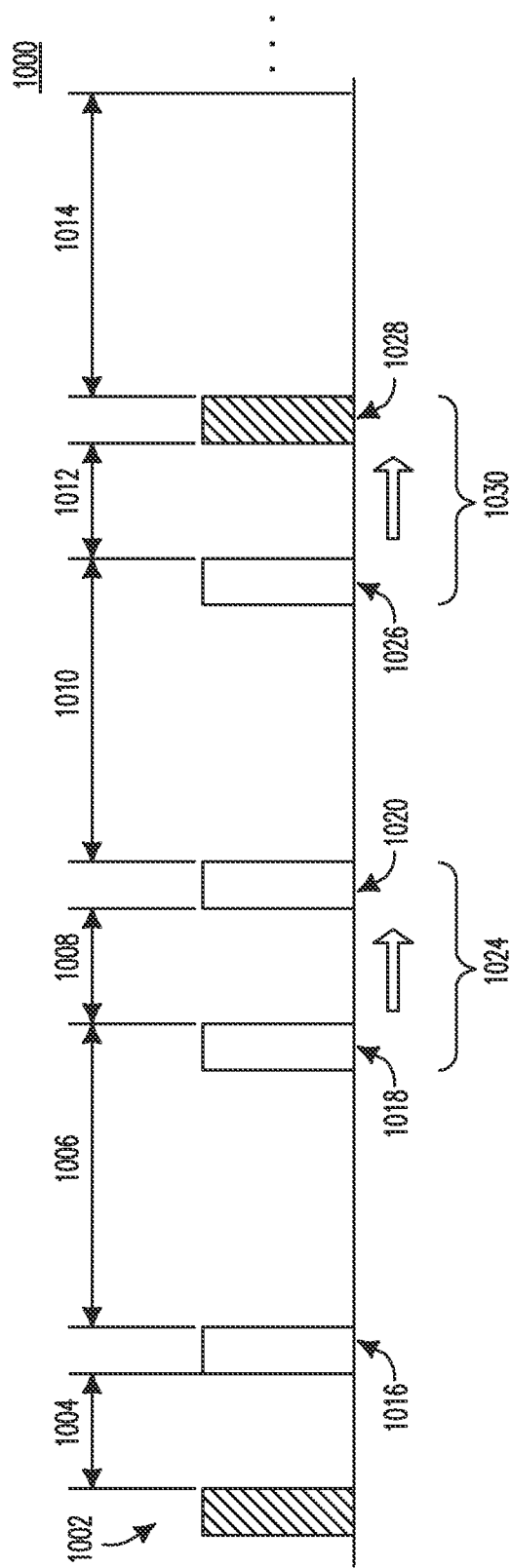
FIG. 10 is a diagram of an example inter-group transmission grant and surrogate polling procedure.

FIG. 10 is a diagram of an example inter-group transmission grant and surrogate polling procedure 1000. When the last STA in a CG (e.g., CG1) is transmitting, it may use an EndCGTX+Inter-GP-TX-GT frame or an EndCGTX+ ACK+Inter-GP-TX-GT frame to provide an inter-group transmission grant to the contender for the next CG (e.g., CG2). In the example illustrated in FIG. 10, the contender for CG1 transmitted its first packet 1016 a SIFS period 1004 after the beacon 1002, starting the transmission period for CG1 1006. At the end of the transmission period for CG1 1006, the AP or the last STA to transmit in CG1 transmits an EndCGTX+ACK+Inter-GP-TX-GT frame 1018, ending the transmission period for CG1, providing the inter-group transmission grant 1024 to the contender for CG2 and acknowledging a frame received by the AP or last STA to transmit in CG1 immediately prior to transmitting the EndCGTX+ACK+Inter-GP-TX-GT frame 1018. In an embodiment, the EndCGTX+Inter-GP-TX-GT or EndCGTX+ACK_inter-GP-TX-GT frame may be sent to the contender for CG2, to an address associated with CG2, such as a group ID, or to the AP. The AP may choose to repeat the EndCGTX+Inter-GP-TX-GT or EndCGTX+ACK Inter-GP-TX-GT frame in order to prevent hidden nodes.

In response to receiving the EndCGTX-Inter-GP-TX-GT or EndCGTX+ACK+Inter-GP-TX-GT frame, the contender for CG2 may begin transmitting after a SIFS period. In the example illustrated in FIG. 10, the contender for CG2 transmits its first packet 1020 a SIFS period 1008 after receiving the EndCGTX+ACK+Inter-GP-TX-GT frame 1018. If the AP is configured to repeat the EndCGTX+Inter-GP-TX-GT or EndCGTX+ACK_Inter-GP-TX-GT frame, the contender for CG2 may begin transmitting a SIFS period after receiving the repeated EndCGTX+Inter-GP-TX-GT or EndCGTX+ACK_Inter-GP-TX-GT frame sent by the AP. In the example illustrated in FIG. 10, the transmission period for CG2 1010 begins following the transmission of the first packet 1020 by the contender for CG2.

When the last STA in a CG is transmitting, it may use an EndCGTX+Inter-GP-SUR-Poll frame or an EndCGTX+ ACK+Inter-GP-SUR-Poll frame to conduct inter-group surrogate polling for the contender of the next CG (e.g., CG3). In the example illustrated in FIG. 10, the last STA to transmit in CG2 transmits an EndCGTX+ACK+Inter-GP-SUR-Poll frame 1026, ending the transmission period for CG2 1010, providing an inter-group transmission grant to the next CG (CG3) 1030 and inquiring about the presence of any buffered DL frame for the contender of CG3. In response to receiving an EndCGTX+Inter-GP-SUR-Poll frame or an EndCGTX+ ACK+Inter-GP-SUR-Poll frame, the AP may transmit DL frames for the contender of the next CG or may transmit a frame indicating that there are no buffered packets for the contender of CG3. In the example illustrated in FIG. 10, after a SIFS period 1012, the AP transmits the DL data for the contender for CG3 1028, beginning the transmission period for CG3 1014. This procedure may be repeated until all of the CGs in the BSS have had a chance to access the medium.

When the AP has detected that all STAs in CG1 have completed their transmissions and the AP has no buffered packets for CG1, the AP may transmit a poll frame or an EndCGTX+Inter-GP-TX-GT to CG2 or the contender of CG2 to grant medium access to CG2.

The design of the frames EndCGTX+Inter-GP-TX-GT, EndCGTX+ACK+Inter-GP-TX-GT, EndCGTX+Inter-GP-SUR-Poll frame and EndCGTX+ACK+Inter-GP-SUR-Poll may be implemented as new subtypes of management frames or control frames or as a new type of frame. In addition, they may also be implemented as action frames or action no ACK frames. For example, they may be implemented as an action frame or action no ACK frame of the type HT, VHT, TVHT, IEEE 802.11ah or as a new type of action frame. They may also be implemented as a short frame where all information is carried in the PLCP header portion.

The frames EndCGTX+Inter-GP-TX-GT, EndCGTX+ ACK+Inter-GP-TX-GT, EndCGTX+Inter-GP-SUR-Poll frame and EndCGTX+ACK+Inter-GP-SUR-Poll may include an explicit ID for a WTRU (e.g., a STA for which the inter-group transmission grant is provided or an inter-group surrogate polling is conducted), such as an AID, MAC address, or other type of ID that the AP and the transmitting STA have agreed upon, in its PLCP/MAC header, frame body, initial scrambler sequence, etc. For example, the ID of STA2 may be included in at least one of the address 3 and/or address 4 field of the MAC header. A bit in the PLCP or MAC header (e.g., in the frame control field) may be used to indicate that address 3 or address 4 fields are in use and/or, in combination of the frame type/subtype/action frame category field, indicate that address 3 or address 4 fields are used for the ID of the STA for which the transmitting STA is providing an inter-group transmission grant or conducting surrogate polling.

In an embodiment, inter-group transmission grant and surrogate polling may be generalized to STA-based transmission grant and surrogate polling for CGs that only include one STA.

Data and frame compression may also be used for STAs within a CG for further reduction of transmission overhead. For STAs within a CG, it may be assumed that they share the security key, and, therefore, they may decode each other's packets. For STAs in a CG that detect similar data (e.g., sensors that are event-driven and detect events such as fire), repeating the same data (either a fire is detected or not) does not provide extra information. Instead, the CG may negotiate for a compressed packet format, for example, a same data indication frame, which may be short in length and indicate that the transmitting STA observes the same data as another STA in the same CG that just transmitted in the CG transmission period.

When a STA in a CG transmits a frame, another STA that observes the same data may simply transmit a same data indication frame instead of a regular frame. The same data indication frame may include an identifier of a frame (such as a sequence or a sequence control number) and an explicit ID of a STA (a STA that transmitted the same data) such as an AID, MAC address, or other type of ID that the AP and the transmitting STA have agreed upon, in its PLCP/MAC header, frame body, initial scrambler sequence, etc. For example, the ID of the reference STA may be included in the address 3 and/or address 4 field of the MAC header. A bit in the PLCP or MAC header (e.g., in the frame control field) may be used to indicate that address 3 or address 4 fields are in use and/or, in combination of the frame type/subtype/action frame category field, indicate that address 3 or address 4 fields are used for the ID of the STA that observes the same data.

The same data indication frame may be implemented as a new subtype of management or control frames or new type of frames. In addition, they may also be implemented as action frames or action no ACK frames. For example, they may be implemented as an action frame or an action no ACK frame of the type HT, VHT, TVHT, IEEE 802.11ah, HEW, or new type of action frame. They may also be implemented as a short frame where all information is carried in the PLCP header portion. In response to receiving the same data indication frame from a WTRU (e.g., STA1) indicating that STA1 observed the same data that was reported by another WTRU (e.g., STA2) in a particular frame, the AP may reconstruct a new data frame from STA1 by copying the frame body of the particular frame sent by STA2.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of transferring small packets in a wireless network, the method comprising:
    generating, by a first wireless transmit/receive unit (WTRU), a control frame for transmission to an Access Point (AP) in the wireless network;
    indicating in a field of the control frame, on a condition that the first WTRU has data buffered for transmission, information related to an estimated time required for transmission of the buffered data;
    transmitting the control frame via an uplink to the AP; and
    receiving a response from the AP, wherein the response includes a granted TXOP.

2. The method of claim 1, further comprising:
    including 0 in the field on a condition that the first WTRU has no data buffered for transmission.

3. The method of claim 1, further comprising:
    transmitting the buffered data during the granted TXOP.

4. The method of claim 1, wherein the response further includes an indication of buffered data for transmission from the AP to the first WTRU.

5. The method of claim 1, wherein the control frame is generated upon the first WTRU awakening from a sleep state.

6. The method of claim 1, wherein the field resides in a physical layer convergence protocol (PLCP) header of the control frame.

7. The method of claim 6, wherein the control frame comprises a null data packet (NDP) power-save poll (PS-Poll) frame.

8. The method of claim 1, wherein the field resides in a medium access control (MAC) header of the control frame.

9. The method of claim 8, wherein the control frame comprises a power-save poll (PS-Poll) frame.

10. The method of claim 1, wherein the AP is a second WTRU.

11. A wireless transmit/receive unit (WTRU) that is associated with a wireless network, the WTRU comprising:
    a processor; and
    a memory comprising instructions that when executed by the processor cause the WTRU to:
        generate a control frame for transmission to an Access Point (AP) in the wireless network;
        on a condition that the WTRU has data buffered for transmission, indicate, in a field of the control frame, information related to an estimated time required for transmission of the buffered data;
        cause the control frame to be transmitted via an uplink to the AP; and
        receive a response from the AP, wherein the response includes a granted TXOP.

12. The WTRU of claim 11, wherein the instructions, when executed by the processor, further cause the WTRU to include 0 in the field on a condition that the WTRU has no data buffered for transmission.

13. The WTRU of claim 11, wherein the instructions, when executed by the processor, further cause the WTRU to cause the buffered data to be transmitted during the granted TXOP.

14. The WTRU of claim 11, wherein the response further includes an indication of buffered data for transmission from the AP to the WTRU.

15. The WTRU of claim 11, wherein the field resides in a physical layer convergence protocol (PLCP) header of the control frame.

16. The WTRU of claim 15, wherein the control frame comprises a null data packet (NDP) power-save poll (PS-Poll) frame.

17. The WTRU of claim 11, wherein the field resides in a medium access control (MAC) header of the control frame.

18. The WTRU of claim 17, wherein the control frame comprises a power-save poll (PS-Poll) frame.

19. The WTRU of claim 11, wherein the instructions, when executed by the processor, cause the WTRU to generate the control frame upon the WTRU awakening from a sleep state.

20. The WTRU of claim 11, wherein the AP is a second WTRU.

* * * * *